June 22, 1937.     M. ASTAFIEV     2,084,312
HYDRAULIC TRANSMISSION OF POWER
Filed July 8, 1933     4 Sheets-Sheet 1
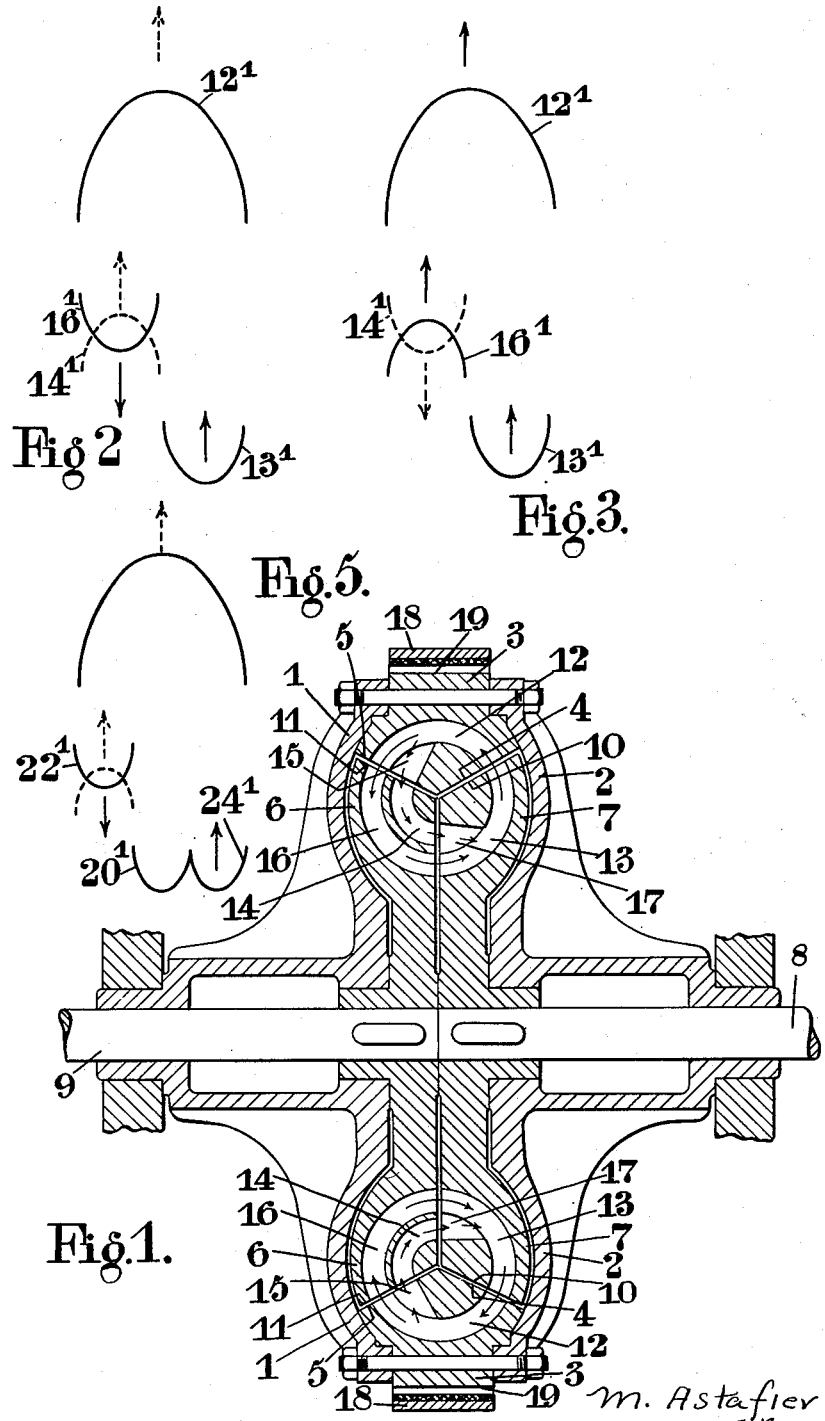

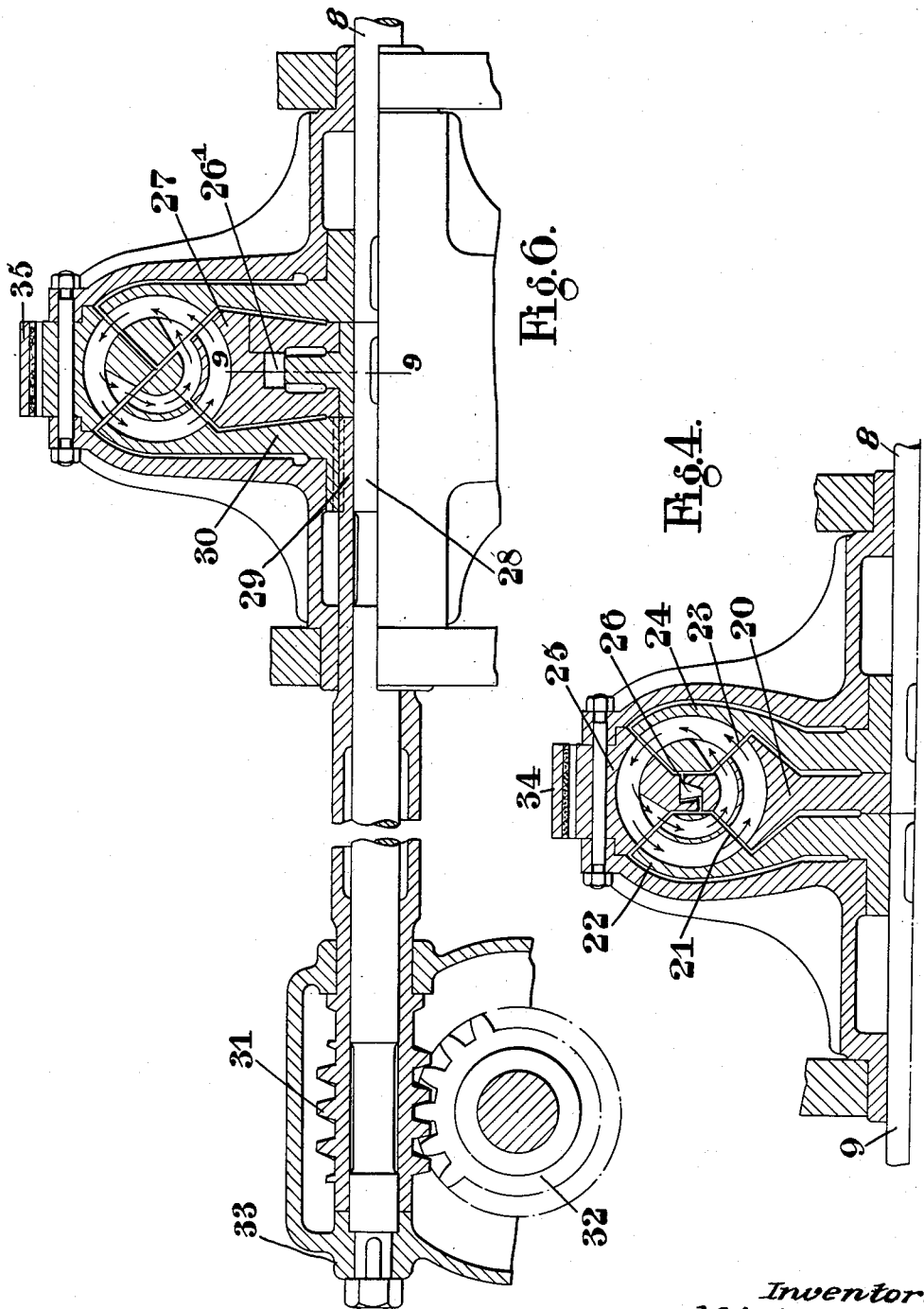

June 22, 1937.  M. ASTAFIEV  2,084,312
HYDRAULIC TRANSMISSION OF POWER
Filed July 8, 1933  4 Sheets-Sheet 3
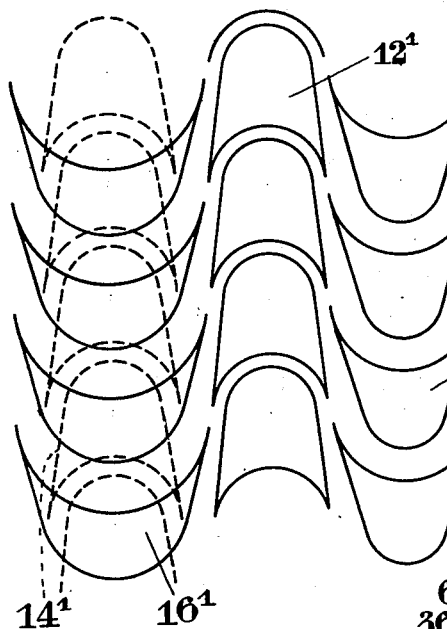
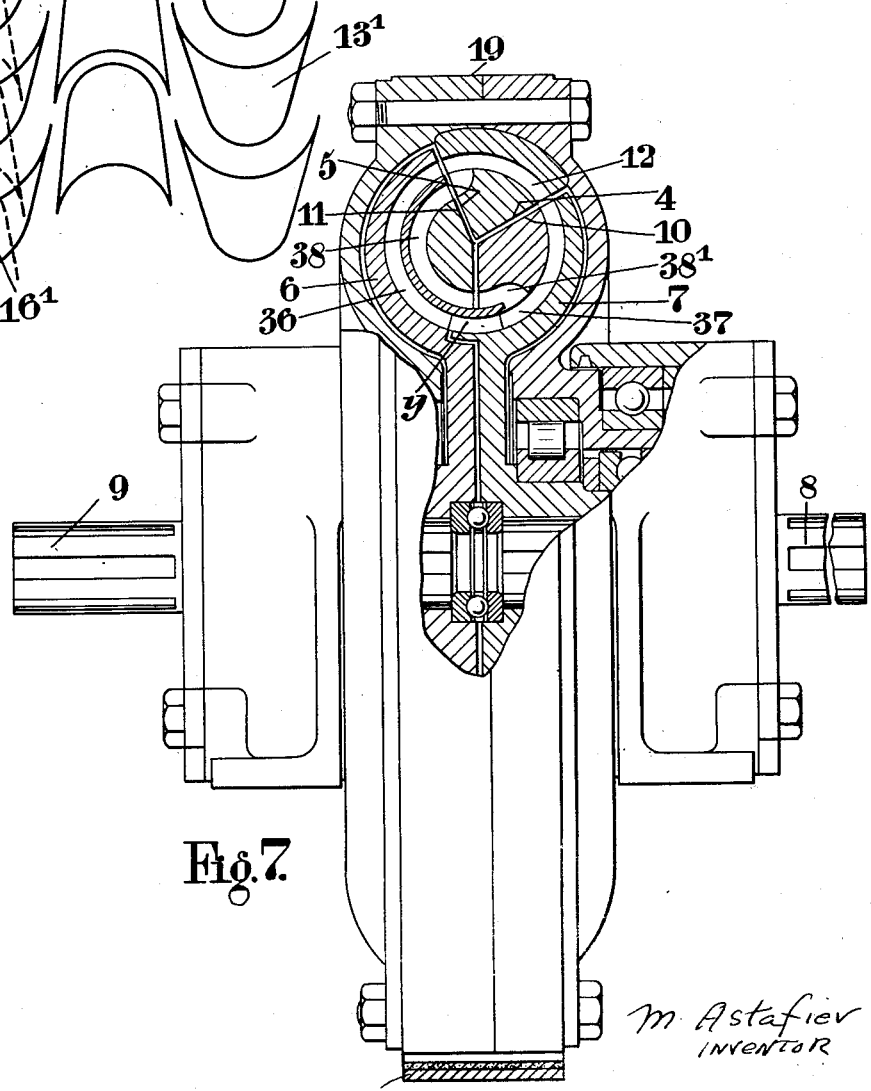

June 22, 1937.  M. ASTAFIEV  2,084,312
HYDRAULIC TRANSMISSION OF POWER
Filed July 8, 1933  4 Sheets-Sheet 4
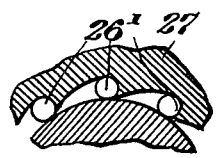
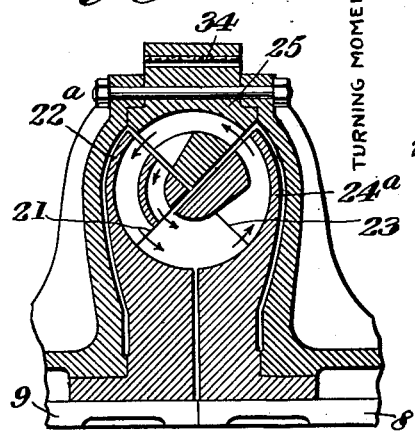
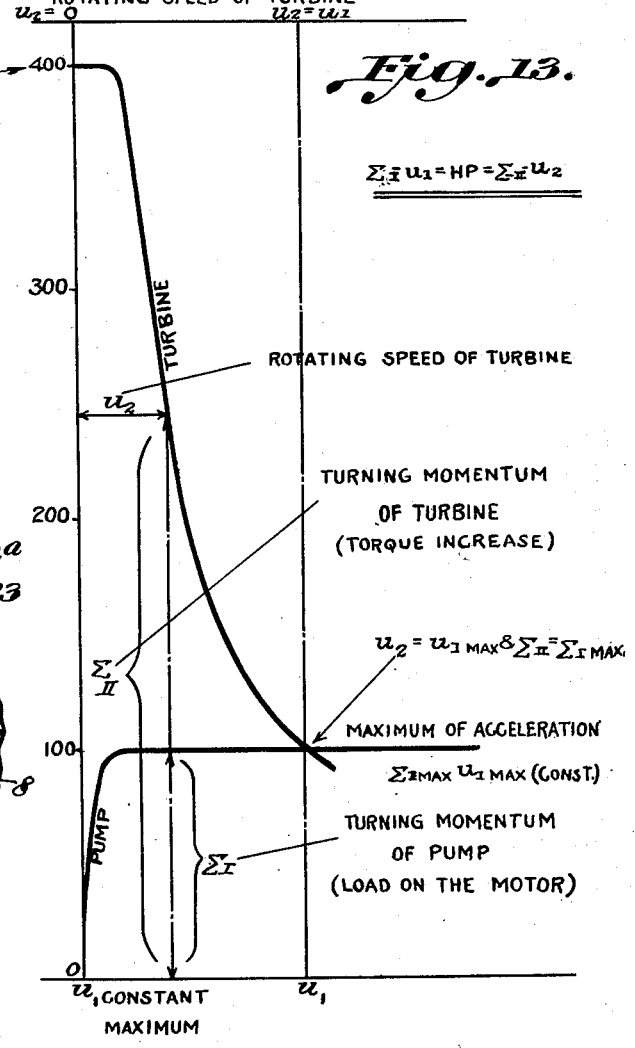
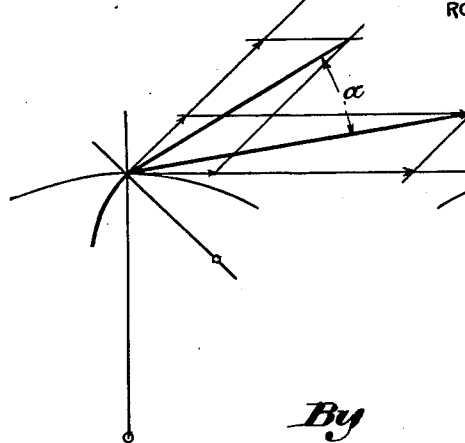
Inventor:
M. Astafiev
By: Glascock Downing & Seebold
Atty.

Patented June 22, 1937

2,084,312

UNITED STATES PATENT OFFICE 2,084,312

HYDRAULIC TRANSMISSION OF POWER

Michael Astafiev, Chelsea, London, England

Application July 8, 1933, Serial No. 679,587
In Great Britain July 9, 1932

5 Claims. (Cl. 60—54)

This invention relates to turbo-transformers for the transmission of power from one rotary member to another by utilizing energy imparted to suitable liquid by a primary or driving member or impeller to impart rotational movement or torque to a secondary or driven member or turbine wheel, for instance at speed ratios such as may vary according to the load upon the shaft to which the secondary member is coupled. A device of the kind referred to may comprise a vaned member subjected to the influence of a motive stream of operating fluid passing from driving to driven members and adapted to control the direction of rotation of the driven member.

The objects of the present invention comprise provision for the operation of such devices in a generally more satisfactory and efficient manner and improved constructions of and modifications to turbo-transformers such as will hereinafter be indicated.

Further objects are provision for the reversal of the direction of rotation of the driven member in a simple manner and for obtaining working curves of improved character in devices of the kind in question.

The invention consists in a device of the kind referred to wherein a driven member comprises two sets of oppositely directed blades or vanes served selectively by a reversed or unreversed stream of fluid leaving said first rotatable vaned member.

The invention consists in a turbo-transformer or fluid torque-converter of the kind set forth employing curved vanes on the driving, intermediate and driven rotary members, in which the direction of rotation of the driven member is determined by the selective action, upon two oppositely directed sets of driven member vanes, of the motive fluid stream leaving the intermediate member vanes with a rotational component opposed to or in the same sense as the driving member according as the intermediate member is braked or debraked.

The invention also consists in fluid power transmission apparatus of the kind referred to wherein changes of transmitted torque are obtained by a reapportionment of the operating fluid between vaned and vane-free regions of a closed circuit forming the operating conduit.

The invention also consists in apparatus of the kind referred to wherein the operating fluid is confined to and only partially fills an operating conduit forming a closed circuit and having a vane-free annulus in the return between driven and driving members.

The invention also consists in a device of the kind referred to wherein vanes of a rotatable vaned member occupy widened chambers embracing the edges of two sets of blades of the driven member.

The invention further consists in a device in accordance with any of the preceding paragraphs arranged to operate with a limited quantity of motive fluid, less than the capacity of the interior of the device.

The invention further consists in a device in accordance with any of the preceding paragraphs wherein minimum or low angled vanes are employed and/or the same vane section is employed on different vaned members.

The invention further consists in a device in accordance with the preceding paragraphs wherein the motive liquid employed is mercury alone or a mixture or emulsion of mercury and oil, say in the proportions of 95 per cent to 80 per cent and 5 per cent to 20 per cent respectively.

The invention further consists in a device according to any of the preceding paragraphs having vanes so arranged as normally to produce reversed rotation of the driven member in relation to the driving member.

Other features of the invention will be set forth in the following description and in the appended claims.

Reference will now be made to the accompanying drawings in which:—

Figure 1 is a sectional view of a direct drive transformer constructed according to this invention.

Figure 2 is a diagrammatic view showing the arrangement of blades preferably employed with the transformer shown in Figure 1.

Figure 3 is a modified form of blade arrangement.

Figure 4 is a part sectional view of a modified form of transformer.

Figure 5 is a diagrammatic view showing a blade arrangement used with the transformer shown in Figure 4.

Figure 6 is a further modified form of transformer with a driving connection to the rear axle of a motor vehicle.

Figure 7 shows a view of a further modified transformer complete with mounting.

Figure 8 shows a blade arrangement which may be employed with the transformer shown in Figure 7.

Figure 9 is a detail section on the line 9—9 of Figure 6.

Figure 10 is a section of an alternative construction of transformer.

Figures 11 and 12 are vector diagrams of different forms of vanes, and

Figure 13 is a graph of the working tracks in one example of the invention.

One convenient form of the invention is shown in Figure 1 which comprises a circular casing formed in two similar halves 1 and 2 which are jointed together on opposite sides of an annular intermediate member 3 having oppositely divergent internal conical surfaces 4 and 5 which intersect at an angle of about 120° on a radial plane situated centrally between the casing halves. Symmetrically within the casing also are a pair of flanges or discs 7 and 6 connected respectively to a driving shaft 8 which can be coupled to any suitable external source of motive power, and to a driven shaft 9, said shafts penetrating the casing at opposite ends through suitable glands or other openings.

The peripheral regions of the two discs 7 and 6 are thickened up so as to fill the interior of the casing within and about said conical surfaces 4 and 5 of the intermediate member 3 to which they respectively present complementary conical surfaces 10 and 11 in such a way that the section of said peripheral regions together with said intermediate member form an approximate circle. Passages 12, 13 and 14 are formed in the three parts referred to which follow approximately a circle or circles concentric with the intersection above referred to and contain the vanes of the device.

The clearances are cut down to a minimum so as to be insignificant compared with the volume of the vane passages whereby the fluid is confined to the latter as desirable.

The vane passages viewed in axial section comprise a portion passing through the inner face of the driving member 7 and curving outwardly to leave the conical surface of the latter where the passage is continued a further 120° through said intermediate member 3. As the passage continues through the latter towards the conical surface separating it from the driven member it diverges as shown at 15 so that its near side is tangent to a circle of smaller radius concentric with the circle mentioned above. Two concentric passages 14 and 16 penetrate the driven member 6 for another 120° and these in turn open into a suitable widened or flared entrance end 17 of the first described passage 13 in the driving member 7. In the passage of the driving member the vanes 13' as shown in Figure 2 are arranged with their concave sides facing in the direction of rotation, as indicated by the arrows, the vanes 12' in the passage of the intermediate member face in the opposite direction, while in the two passages of the driven member the vanes 14' which occupy the inner passage and the vanes 16' of the outer passage respectively face oppositely to and in the same way as the vanes of the driving member. In this preferred arrangement shown in Figure 2 the driven vanes, which face in the same rotational sense as the vanes 13' of the driving member and are to function in normal operation of the device, are arranged as at 16' and occupy the outer passage 16 of Figure 1 where the operating fluid is most definitely thrown in its circulating motion under centrifugal action as hereinafter explained.

A brake 18 is provided adapted to engage the peripherally exposed surface 19 of the casing whereby the latter may be stopped from rotating or allowed to run freely, and the normal mode of operation of the device described above producing rotation of the driven member in the opposite sense to the driving member is as follows:—

When the driving shaft 8 is rotated to move the driving member vanes 13' (Figure 2 or 3) in the direction shown, the operating fluid is impelled into the oppositely facing vanes 12' of the intermediate member 3. The latter is braked so as to cause its vanes 12' to operate to reverse the direction of the fluid passing through them and so to cause the fluid stream from the vanes 12' to meet the face 11 of the driven member (see Figure 1) with a rotational component, about the shafts 8 and 9, directed in the opposite sense to that of rotation of the driving member 7. The stream in passing through the passage 12 containing the vanes 12' will also tend to adhere under centrifugal action to the radially outermost side of the passage 12 and so will meet said face 11 in the region of the leading edges of the vanes in the outer passage 16 of the driven member 6.

If the said driven vanes be arranged as are 16' in Figure 2, the stream meeting the face 11 as above will be directed into the concave or operative faces of the vanes to produce rotation of the driven member 6 oppositely to the driving member 7; while such fluid as may meet the said face opposite to the vanes 14' of the inner passage 14 will tend in view of the abovementioned rotational component only to impinge upon the backs of the vanes 14' at their leading edges with practically negligible effect. The fluid in completing its more or less vortexial circuit in the vanes 16' is returned to the vanes 13' of the driving member. Alternatively, if the driven member vanes be arranged as shown in Figure 3, so that the vanes 16' facing oppositely to the driving member vanes 13', occupy the outer passage 16, the action on the fluid is somewhat different; and in this case the reversed fluid stream, tending as above to impinge mainly upon the entrance to the outer passage 16, cannot, on account of its rotational component, effectually enter and operate upon the vanes 16'. On the contrary it is substantially repelled by the leading edges of said vanes and the stream through the vanes 12' is diverted inwardly by the accumulating fluid opposite the vanes 16' and into the inner set of vanes 14' which it then meets with the rotational component requisite to the operation of these latter vanes and to the production of rotation of the driven member oppositely to the driving member as before.

When, however, the casing is de-braked the action is as follows:—

The stream of fluid from the driving vanes 13' passes through the intermediate vanes 12' without reversal of the rotational component imparted to it, since the intermediate member 3 is free to idle round with the casing. Hence the stream of fluid meets the face 11 of the driven member 6 with a rotational component, in this case, directed in the same rotational sense as the driving member and therefore adapted for operation upon that set of the driven vanes which faces oppositely to the driving vanes 13', thereby to produce rotation of the driven member 6 in the same sense as the driving member 7. When the preferred arrangement of the driven vanes described above and shown in Figure 2 is adopted, the fluid in the vicinity of the face 11 of the driven member on account of its being unreversed is substantially rejected by the leading edges of the outer vanes 16' and its course is diverted inwardly, as already described, into the inner vanes 14' wherein its unreversed rotational component can be effectively utilized in producing the desired rotation of the driven member. Similarly, when the vane arrangement is as shown in Figure 3, the stream from the vanes 12' operates on the vanes 16' and without substantial effect upon the vanes 14'.

Referring now to the fluid stream in its return to the driving member vanes 13', it will be seen that during normal operation of the device, i. e. when the driven and driving members rotate oppositely, the fluid leaving the driven vanes 16' of Figure 2 or 14' of Figure 3 does so with a rotational component which is never opposed to the sense of rotation of the driving member to the vanes of which it is returned, but which on the other hand increases with the ratio of speed reduction.

It is found that this condition minimizes turbulence and loss of efficiency and enables substantially true torque conversion to be obtained, i. e. the production of torque on the driven shaft substantially in inverse proportion to the ratio of speed reduction and in direct proportion to the resistance to be overcome. Moreover, as a condition of speed falling off between driving and driven members connotes a call for torque increase the efficiency of torque conversion due to increase of said rotational component is improved as desirable with increase in the resistance to be overcome, and satisfactory operation of the device as a torque converter is thus assured in the normal mode of use.

On the other hand, when the casing is debraked to produce rotation of the driven member in the same sense as the driving member, the stream of fluid leaving the operative driven vanes 14' of Figure 2 and 16' of Figure 3 has a rotational component which, whatever be the load on the driven shaft and the consequent ratio of speed reduction, is in all cases directed in the opposite sense to the driving vanes and accordingly more or less turbulence and loss of efficiency always occurs. Furthermore, such component increases with the ratio of speed reduction, producing increased turbulence when the load is increased, and so the action of the above described device with the casing de-braked and the driving and driven members rotating in the same sense approximates merely to that of a slipping mechanical clutch in which speed reduction is only obtained by increasing inefficiency of transmission and dissipating energy.

It has been found that the principal requirements for efficient operation of turbines of the above character are that the casing shall not be fully filled with the motive liquid, that the blades and other parts exposed to liquid shall be designed according to impulse turbine principles, and e. g. as shown in Figure 8 that the entrance and exit angles of the vanes of all sections or members shall be reduced to a minimum.

Further desiderata are, the vortex circles as represented by the circle of the passages mentioned above shall be of the smallest possible diameter and that this circle with the vanes of the various members shall be set at the biggest possible radius from the axis of rotation of the system.

It has also been found that it is possible to obtain high efficiency and a reduction in the size of transformer for any given output by the employment as motive fluid of mercury with or without an addition of 5 to 20 per cent. by volume of a liquid oil. With a mixture of this kind the mercury becomes emulsified and is converted into subdivided spheroidal particles which are highly mobile and of which the coefficient of friction against the walls as well as the internal friction of the particles are greatly reduced. Further, the mercury in such a state of suspension is protected with other parts of the device against oxidation.

A transformer constructed in accordance with the foregoing description is capable of producing working or efficiency curves as good as any which have been obtained up to the present in addition to its being provided with the simple means described for changing the direction of rotation of the driven member.

For automobile purposes inefficiency in reverse operation, i. e. when the driving and driven members of the device rotate in the same sense as above described, is not per se a serious matter on account of the less frequent use of reverse than of forward drive. The modification shown in Figure 4 aiming essentially at improved efficiency and improved working curves in respect of normal operation, as already defined, provides also for efficient torque conversion when the casing is de-braked.

In this form of the invention an additional member 20 is introduced whereby a series of blades are interposed between the outlet edges 21 of the vanes of the driven member 22 and the inlet edges 23 of the vanes in the driving member 24. The additional member 20 has a section similar to that of the intermediate member described above, the driving, driven and intermediate members 24, 22 and 25 being each reduced in size to accommodate the additional member 20 within the generally circular section containing the various passages. In such a case the four vaned members may each describe a quadrant in the vortex circle and the additional member 20 is generally of a similar section to that of the driven member 22, that is to say the twin passages of the latter are continued through the additional member. The vanes 20' as shown in Figure 5 in the twin passages of the additional member 20 are arranged respectively to change the direction of the fluid stream after it leaves the vanes 22' of the driven member, and in most cases the first-mentioned vanes are of exactly the same section as the vanes in the other three members and they are further arranged to face in the same direction as the driving member vanes 24'. The additional member is arranged so that it is free to rotate in the same direction as the driving member while any reverse rotation is prevented. This is conveniently obtained by arranging a ratchet connection 26 or one-way clutch of any well known type between the additional member and the intermediate member 25. The clutch may comprise, for instance, rollers running upon a smooth track on one of the members and as will be clear from Figure 9 contained respectively in cavities in the other member, such cavities having curved or sloping sides against which the rollers may be wedged on appropriate relative rotational movement between the said members. The casing of the transformer is provided with braking means 34 whereby the desired change of direction of the driven member may be obtained.

Normal operation of the modified device as before involves braking of the casing and intermediate member 25 the fluid behaving as already described so far as concerns its movement in relation to the vanes of the intermediate member 25 and to the two oppositely facing sets of vanes in the driven member 22. In normal operation therefore with the driven member rotating oppositely to the driving member the fluid stream leaves the outlet edges of the vanes 22' (Figure 5) with the greater or less rotational component in the sense of rotation of the driving member and in leaving the said vanes enters and passes through the opposite set of vanes of the additional member 20', into the vanes 24' of the driving member 24. In traversing the vanes 20' the stream due to its rotational component in the sense of the driving member 24 carries round the additional member 20' and the said rotational component is found to be somewhat augmented on reaching the driving vanes 24' providing improved efficiency.

When the casing is debraked however for the reasons above explained the fluid stream leaving the vanes of the driven member which face oppositely to the driving member vanes has a rotational component opposed to the rotation of the driving member and enters the vanes 20' in the opposite passage of the additional member 20, and as the latter is prevented by the ratchet connection 26 from rotating relative to the intermediate member under the action of the fluid the stream is reversed before being returned to the driving member vanes 24'.

The behaviour of the modified device therefore is substantially the same whether the casing is braked or debraked and efficient torque conversion is obtained with the driven member rotating in either sense.

In the preferred modified arrangement shown in Figure 6 a ratchet device 26' of the same kind as described is employed which is situated between the additional member 27 and a fixed shaft 28 arranged coaxially with a hollow shaft 29 carrying the driven member 30. The shaft 29 extends rearwardly and is formed adjacent its extremity with a worm 31 for transmitting driving force to the worm wheel 32 and which may constitute part of the rear axle assembly of a motor road vehicle. The shaft 28 supports the shaft 29 and as shown is rigidly attached to the differential housing 33. The casing of the transformer is provided with a brake device 35 which may either stop the rotation of the casing or allow same to run freely, and the action of the device in both instances corresponds to that described with reference to Figures 4 and 5.

While the various constructions described have all been found efficient, of special utility are those provided with the additional vaned member and thus affording efficient torque conversion in either direction of the driven member, particularly the form shown in Figure 6, where the additional member 27 has no mechanical connection with the intermediate member and casing.

Modifications and additions may be introduced more especially in respect of the section of blades used although it is preferred to follow the usual practice in impulse turbine work and to adopt a cycloidal section. Further, the leading and exit ends of the blades are set at very small angles to the frusto-conical imaginary surface in which the vane ends lie with the particular object of rendering the transformer less subject to great fluctuations of efficiency with changes in the speed ratio of the driven and driving members, say on account of overloading, and as will be understood it is not essential to a satisfactory operation that the intermediate member described above shall be fixed to and rotated with the casing. The importance of a small angle of inlet and outlet ends of the vanes can be seen from Figures 11 and 12. In the case of variable ratios the speed of the streams does not always correspond to the speed of the blades.

If the angle of the blade is large as in Figure 11, the amplitude of the variable angle $\alpha$ of the stream is also large; the smallest angle of blade gives the smallest amplitude ($\alpha_1$) (Figure 12). It follows therefore that the loss of energy in the case of small angle of blades is less, because the co-efficient of loss (in this respect) is a function of the incorrect angle at which the stream enters the blade.

It is understood that the turbo-transformers described above may be used in combination with a suitable form of differential gear.

In an alternative and simplified construction to those above described as embodying an additional or free-wheel vaned member, the desirable form of working curves and high efficiency over great ranges of speed ratios, with consequent adaptability of the device to heavy loading of the driven member and to the production of high static turning moments, as required say in automobile or motor vehicle work, can be obtained by the expedient of providing a vane-free channel or channels in the return circuit of the motive fluid from the driven member blades to those of the driving member. The construction shown in Figure 7 may for instance have the vanes of the said two members modified in the following sense. The vanes in the passage 36 face in the same rotational sense as the vanes of the driving member and are intended to function in normal operation of the device, being situated where the operating fluid is most definitely thrown in its circulating motion under centrifugal action as hereinafter explained.

In the twin passages of the driven member the vanes of the outer passage 36 terminate say some 20° short of central plane of rotation above referred to, and in the passage 37 in the driving member the vanes may commence only some 20° beyond said plane so as to leave a free annular space $y$ or length of channel in fixed relation to and continuous with the remainder of the passage, extending over a considerable arc, of about 40°. The angles above referred to may in some cases be such as to enlarge said space to about 90°.

The normal mode of operation of the device is such that the casing is held fixedly so as to produce rotation of the driven member in the opposite sense to the driving member, as follows:—

When the driving shaft 8 is rotated to move the driving member vanes 13' (Figure 2) in the direction shown, the operating fluid is impelled into the oppositely facing vanes 12' of the intermediate member 3. The latter is braked so as to cause its vanes 12' to operate substantially completely to reverse the direction of the fluid passing through them and so to cause the fluid stream from the vanes 12' to meet the face 11 of the driven member (see Figure 1) with a rotational component, about the shafts 8 and 9, directed in the opposite sense to that of rotation of the driving member 7. The stream in passing through the passage 12 containing the vanes 12' will also tend to adhere under centrifugal action to the radially outermost side of the passage 12 and so will meet said face 11 in the region of the leading edges of the vanes 16' in the outer passage 36 of the driven member 6 and will be directed into the concave or operative faces of the vanes to produce rotation of the driven member 6 oppositely to the driving member 7; while such fluid as may meet the said face opposite to the vanes 14' of the inner passage 14 will tend in view of the above-mentioned rotational component only to impinge upon the backs of the vanes 14' at their leading edges with practically negligible effect. The fluid in completing its more or less vortexial circuit in the vanes 16' is returned to the vanes 13' of the driving member via the annular space y.

Reverting, now, to the fluid stream in its return to the driving member vanes 13', it will be understood that during normal operation of the device, i. e. with the driven and driving members rotating oppositely and when the torque in the driven shaft is greater than that in the driving shaft and the former rotates with a lower speed than the latter, the fluid leaving the driven vanes 16' of Figure 2 does so with a rotational component. Such component is never opposed to the sense of rotation of the driving member to the vanes of which it is being returned, but on the other hand increases with the ratio of speed reduction.

Also, when the driven member rotates at substantially the same speed as, but in the opposite direction to, the driving member, the fluid leaves the driven member vanes 16' and enters the vane-free space or length of channel y substantially without kinetic energy or any rotational component, having delivered substantially all its kinetic energy to the vanes of the driven member and produced thereon a torque substantially equal to the torque on the driving shaft, at the said substantially equal speeds of rotation.

In these conditions the motive fluid traverses the annular space y substantially without turbulence and either with or without a tendency to rotate therein under any rotational discharge component about the common axis of rotation; and if caused to rotate, the fluid does so in the same direction as the driving member rotates, and adheres under the centrifugal force accompanying such rotational movement to the side of said space the further away from the said axis. The proportion of fluid at any instant in the said space is such that the remainder in active use in the vanes is sufficient to transmit the torque demanded at the speed of the driven member then obtaining.

With different loads on the driven shaft and different ratios of speed reduction, a greater or less proportion of the mercury or other motive liquid is traversing the said vane-free annular space y at any instant while the remainder is performing the vortexial power transmitting motion above described. With increasing loads and greater speed ratios the increased rotation component of the discharged liquid causes proportionate increase of the said centrifugal force, promoting reapportionment of the fluid between the annular space and the vanes, i. e. the return of an increasing proportion of fluid into active use in the vanes to provide the added kinetic energy to meet the altered conditions of operation and produce augmented torque upon the driven member.

The desirable form of working curves and high efficiency over great ranges of speed ratios, with consequent adaptability of the device to heavy loading of the driven member and to the production of high static turning moments, as required say in automobile or motor vehicle work, can thus be obtained by the provisions explained above.

With respect to the set of vanes 14', in the channel or passage 38, when a vane-free space is provided at 38' as shown, the action of the same upon the fluid in reverse operation, i. e. with the driving and driven members rotating in the same sense, is substantially as described above with reference to the normal operation and results in an improvement in the efficiency of the apparatus as a power transmitter for reverse drive.

Applying the last described or modified principle to the third and fourth described devices it is sufficient completely to remove the vanes of the additional or free-wheel member and the ratchet connection and the additional member become superfluous, leading the additional member as desired to a construction as shown in Figure 10 where an equivalent to such additional member is provided by thickening up the metal of each of the two vaned rotary members 22a and 24a. Referring to the curves shown in Figure 13, these have been calculated on the following basis:—

1. The internal friction of the fluid and of the mechanical parts of the machine is ignored.
2. The speed of rotation of the pump or driving member is $u_{1\ max}$=constant.
3. The machine is calculated for a 1 x 4 torque increase.
4. The maximum turning moment of the pump is $\Sigma_{I\ max}$=100.

If the speed of rotation of the driven member or turbine is $u_2$=0, (i. e. fully braked), the maximum static turning momentum is reached when $\Sigma_{II\ max}$=400, and the pump rotates at the maximum constant speed $u_{1\ max}$ but without any resistance: the turning moment $\Sigma_I$=0, and the pump rotates as free without load. Therefore only enough acceleration is necessary to overcome the internal resistance of the motor itself.

When the turbine load is decreased so that it is allowed to rotate, and its speed $u_2$ gradually increases, the turning moment remains the same, i. e. $\Sigma_{II\ max}$=400, until the increase of the acceleration reaches the constant maximum of the turning moment of the pump $\Sigma_{I\ max}$=100.

With further increase of the speed $u_2$ of the turbine, the turning moment of the turbine is gradually decreased, (because the $\Sigma_I$ and $u_1$ are maximum constant, but the actual performance must correspond to the formula $\Sigma_I.u_1=\Sigma_{II}.u_2$) until $u_2$ becomes equal to $u_1$. When the $u_2=u_1$, there is the same effect of performance, as that of direct coupling: the speed of the turbine is the same as the speed of the pump ($u_2=u_1$) and the turning moment of the turbine is also equal to the turning moment of the pump $\Sigma_{II}=\Sigma_I$=100, with the members rotating in opposite senses.

Other modifications and additions may be introduced without departing from the spirit of this invention.

Having now described my invention, what I claim as new and desire to secure by Letters Patent is:—

1. Fluid power transmitting apparatus for operation with an only partly filled operating conduit comprising coaxial rotary driving and driven members and passages provided with vanes having wholly concave operating faces, said passages co-operating to define a closed operating fluid circuit outside the common axis of rotation said circuit being for the greater part of its length vaned, the vanes of the driven member comprising two juxtaposed sets oppositely directed and curving inwardly in adjacent arcuate paths towards the common axis and a vaned intermediate member interposed to be passed through by the operating fluid in its passage from the said driving set of vanes to said driven sets and having its vanes directed in the opposite rotational sense to said driving set, the vanes of said intermediate member having widened outlet edges embracing the inlet edges of said two sets of driven member vanes, and the vanes throughout having low inlet and outlet angles.

2. Fluid power transmitting apparatus for operation with an only partly filled operating conduit comprising coaxial rotary driving and driven members and passages provided with vanes having wholly concave operating faces, said passages co-operating to define a closed operating fluid circuit outside the common axis of rotation said circuit being for the greater part of its length vaned, the vanes of the driven member consisting of two sets oppositely directed and curving inwardly in adjacent arcuate paths towards the common axis said two sets being respectively accommodated in separate passages radially one within the other in relation to the operating circuit, and a vaned intermediate member having its vanes directed in the opposite rotational sense to those of the driving member interposed to be passed through by the operating fluid in its passage from the said driving set of vanes to said driven sets, the outlet edges of both said sets of driven vanes being operatively opposite to the inlet edges of the driving vanes and the inlet edges of said both sets operatively opposite the outlet edges of the vanes of said intermediate member, the radially outermost one of such sets being the set with its vanes facing in the same rotational sense as those in the driving member and the vanes throughout having low inlet and outlet angles.

3. Fluid power transmitting apparatus for operation with an only partly filled operating conduit comprising coaxial rotary driving and driven members and passages provided with vanes having wholly concave operating faces, said passages co-operating to define a closed operating fluid circuit outside the common axis of rotation said circuit being for the greater part of its length vaned, the vanes of the driven member comprising a set curving inwardly in an arcuate path towards the common axis and having their concave operating faces directed in the same rotational sense as the vanes of the driving member, a vaned intermediate member interposed to be passed through by the operating fluid in its passage from the said driving set of vanes to said driven set and having its vanes directed in the opposite rotational sense, and an additional freely rotatable rotary member coaxial with the others, presenting vanes interposed in the return circuit from driven to driving members, the vanes in such additional member having concave operating faces arranged in the same rotational sense as those of the driving member and means operative to restrict any rotational movement of the additional member to the same sense as the rotation of said driving member, and the vanes throughout having low inlet and outlet angles.

4. In a fluid power transmitter, rotatable driving and driven members arranged in juxtaposition, on a common axis, a fluid reversing member interposed coaxially between peripheral regions of said two members, said driving and interposed reversing member having each a single vaned passage, the driven member having two mutually isolated vaned passages with the vanes respectively therein presenting concave operative faces in opposite rotational senses and the vanes of both said latter passages lying operatively opposite at inlet edges and outlet edges respectively to one side of the reversing member and to the side of the driving member remote from said reversing member.

5. In a fluid power transmitter for operation with an only partly filled operating conduit, a rotary driving member comprising a single set of vanes, a member coaxial with the first presenting opposite the outlet edges of said driving member vanes a single set of vanes facing in the opposite rotational sense, a driven member rotatable coaxially with the first two and provided with two sets of mutually isolated and mutually oppositely facing vanes having the inlet edges of both sets disposed opposite to widened discharge edges of the vanes of said second-mentioned member and outlet edges of said both sets disposed opposite to widened inlet edges of the driving member vanes, the whole of said vanes being contained in and so as substantially to fill arcuate passages completing together a turn in said members outside of the common axis thereof.

MICHAEL ASTAFIEV.